United States Patent
Takayama

(10) Patent No.: US 8,149,467 B2
(45) Date of Patent: *Apr. 3, 2012

(54) E-MAIL TRANSMISSION APPARATUS, E-MAIL TRANSMISSION METHOD AND E-MAIL TRANSMISSION PROGRAM

(75) Inventor: Norihisa Takayama, San Jose, CA (US)

(73) Assignee: Minolta Co., Ltd., Osaka-Shi, Osaka (JP)

(*) Notice: Subject to any disclaimer, the term of this patent is extended or adjusted under 35 U.S.C. 154(b) by 598 days.

This patent is subject to a terminal disclaimer.

(21) Appl. No.: 11/648,645

(22) Filed: Jan. 3, 2007

(65) Prior Publication Data

US 2007/0109595 A1    May 17, 2007

Related U.S. Application Data

(62) Division of application No. 10/073,952, filed on Feb. 14, 2002, now Pat. No. 7,209,263.

(30) Foreign Application Priority Data

Mar. 23, 2001  (JP) .................................. 2001-84679

(51) Int. Cl.
*G06F 3/12* (2006.01)

(52) U.S. Cl. ....... 358/402; 358/1.15; 709/206; 709/207; 709/203; 726/14; 726/4; 726/22; 713/150; 713/165

(58) Field of Classification Search .................. 358/402, 358/468, 1.15; 709/206, 207, 203, 223; 713/165, 713/150; 726/14, 4, 22; 434/362
See application file for complete search history.

(56) References Cited

U.S. PATENT DOCUMENTS

| | | | | |
|---|---|---|---|---|
| 5,761,415 | A * | 6/1998 | Joseph et al. | 709/200 |
| 5,999,932 | A * | 12/1999 | Paul | 1/1 |
| 6,025,931 | A * | 2/2000 | Bloomfield | 358/402 |
| 6,247,045 | B1 * | 6/2001 | Shaw et al. | 709/207 |
| 6,366,950 | B1 | 4/2002 | Scheussler | |
| 6,470,171 | B1 * | 10/2002 | Helmick et al. | 434/362 |
| 6,643,687 | B1 | 11/2003 | Dickie et al. | |
| 6,710,894 | B1 | 3/2004 | Ogawa | |
| 6,732,101 | B1 * | 5/2004 | Cook | 1/1 |
| 6,785,018 | B2 | 8/2004 | Wakabayashi | |
| 6,868,498 | B1 * | 3/2005 | Katsikas | 726/14 |
| 7,019,858 | B1 * | 3/2006 | Gopalasamy | 358/1.15 |
| 7,406,596 | B2 * | 7/2008 | Tararukhina et al. | 713/165 |
| 7,457,842 | B2 * | 11/2008 | Heilmann | 709/206 |
| 7,685,414 | B1 * | 3/2010 | Appenzeller et al. | 713/150 |
| 7,693,948 | B2 * | 4/2010 | Heix et al. | 709/206 |
| 2001/0034849 | A1 * | 10/2001 | Powers | 713/202 |
| 2002/0013817 | A1 | 1/2002 | Collins et al. | |

(Continued)

FOREIGN PATENT DOCUMENTS

JP   A-11-027489   1/1999

(Continued)

*Primary Examiner* — David K Moore
*Assistant Examiner* — Ashish K Thomas
(74) *Attorney, Agent, or Firm* — Buchanan Ingersoll & Rooney PC

(57) ABSTRACT

A technology for use in an e-mail transmission apparatus capable of preventing or discovering 'impersonation' in e-mail transmission efficiently, in which an e-mail is sent not only to a receiving address, but also to a sending address set by a sender.

3 Claims, 17 Drawing Sheets

U.S. PATENT DOCUMENTS

| | | |
|---|---|---|
| 2002/0042816 A1 | 4/2002 | Bae |
| 2002/0107928 A1* | 8/2002 | Chalon .................. 709/206 |
| 2002/0112010 A1* | 8/2002 | Soroker et al. ........... 709/206 |
| 2002/0129108 A1 | 9/2002 | Sykes, Jr. |
| 2002/0188683 A1* | 12/2002 | Lytle et al. .............. 709/206 |
| 2003/0231207 A1* | 12/2003 | Huang .................... 345/752 |
| 2005/0060375 A1* | 3/2005 | Ernest et al. ............ 709/206 |
| 2006/0184609 A1* | 8/2006 | Deng ..................... 709/203 |

FOREIGN PATENT DOCUMENTS

| | | |
|---|---|---|
| JP | 2001036571 | 2/2001 |

* cited by examiner

E-MAIL TRANSMISSION APPARATUS, E-MAIL TRANSMISSION METHOD AND E-MAIL TRANSMISSION PROGRAM

CROSS REFERENCE TO RELATED APPLICATION

This application is based on Japanese Patent Application No. 2001-84679 filed in Japan on Mar. 23, 2001 and is a divisional of U.S. patent application Ser. No. 10/073,952 filed on Feb. 14, 2002 now U.S. Pat. No. 7,209,263.

BACKGROUND OF THE INVENTION

1. Field of the Invention

The present invention pertains to a security technology used when e-mail is transmitted, and more particularly, to a technology that discovers 'impersonation' when e-mail is transmitted.

2. Description of the Related Art

In the conventional art, various technologies have been proposed to confirm the identity of other party when data is transmitted or received over a network. For example, in Japanese Laid-Open Patent Application H11-27489, a technology is disclosed in which, during facsimile transmission, the receiving facsimile mail apparatus reads an e-mail address included in the received facsimile mail message and identifies the sending facsimile apparatus, and returns a notification of receipt. With such an apparatus, by receiving the notification of receipt, the sending facsimile apparatus can confirm the identity of the facsimile mail apparatus to which the message was sent, and at the same time, where a false e-mail address is sent, because the notification of receipt is returned to the person whose address was used without authorization (hereinafter referred to as the 'proper account holder'), so-called 'impersonation' in which an e-mail is sent via the address of another through deceit, can be discovered.

Furthermore, a technology known as 'POP Before SMTP', in which one's own password-protected account is accessed and a message can be sent only after it is confirmed that one is the actual user of that account, is also known. With this technology, even for communications using SMTP and the like, which lack a function to validate the sender's identity, 'impersonation' can be prevented because data cannot be sent via the address of another.

However, from the standpoint of preventing or discovering 'impersonation', the technology used in the facsimile apparatuses described in the above laid-open patent application entails the problem that it requires the receiving facsimile to be equipped with a function corresponding to the technology used. Moreover, because a notification of receipt is returned at all times when a facsimile mail message is sent, the problem of increased network load arises. In addition, the problem exists that the desire to check the contents of the sent e-mail message that was falsely identified through 'impersonation' cannot be accommodated.

Furthermore, the 'POP Before SMTP' technology described above entails the problem that one's own account must be accessed when sending is performed, requiring operations such as password input to be performed.

OBJECTS AND SUMMARY

An object of the present invention is to provide an improved security technology that eliminates the problems described above.

Another object of the present invention is to provide a technology that enables 'impersonation' to be prevented or discovered without requiring the receiving apparatus to be equipped with a particular function.

Still another object of the present invention is to provide a technology that enables 'impersonation' to be prevented or discovered without requiring the user to perform a special operation.

A separate object of the present invention is to provide a technology that enables 'impersonation' to be prevented or discovered while minimizing the load on the network.

A separate object of the present invention is to provide a technology that can not only discover the fact that 'impersonation' has occurred, but can also check the contents of the communication that was falsely identified through 'impersonation'.

These objects are achieved by providing an e-mail transmission apparatus comprising:

sending address input means that receives user input of the sending address;

receiving address input means that receives user input of the intended receiving address;

receiving address list creation means that creates a receiving address list that includes at least the receiving address input using the receiving address input means; and address adding means that, when a sending address is input using the sending address input means, adds the sending address to the receiving address list.

It is preferred that the e-mail transmission apparatus described above further include sending means that sends e-mail based on the receiving address list. This sending means sends e-mail using one of the following methods: (1) while sending the e-mail to the receiving addresses in the receiving address list, simultaneously sending the e-mail to the sending address in the receiving address list; (2) sending the e-mail to the sending address in the receiving address list independently from sending the e-mail to the receiving addresses in the receiving address list; (3) first sending the e-mail to the sending address in the receiving address list, and then only after a return communication is received thereto, sending the e-mail to the receiving addresses in the receiving address list; and (4) when the e-mail is sent to the sending address in the receiving address list, sending only a portion of the data comprising the e-mail message.

It is also acceptable if the e-mail transmission apparatus described above includes registration means that registers the unique e-mail address assigned to the e-mail transmission apparatus, and the address adding means adds the sending address to the receiving address list only where the sending address input using the sending address input means does not match the unique e-mail address registered by the registration means.

It is also acceptable if the address adding means in the e-mail transmission apparatus described above adds the sending address to the receiving address list in a format such that it cannot be deleted from the receiving address list.

It is also acceptable if the e-mail transmission apparatus described above includes display means that displays the receiving addresses and sending addresses contained in the receiving address list.

These objects are achieved by providing an e-mail transmission method comprising:

(a) a step of receiving user input of a sending address;

(b) a step of receiving user input of a receiving address;

(c) a step of creating a receiving address list that includes at least the receiving address input in step (b) above; and (d) a step of adding the sending address to the receiving address list when it was input in step (a) above.

The above objects are also achieved by providing a program that causes a computer to execute a routine comprising:

(a) a step of receiving user input of a sending address;

(b) a step of receiving user input of a receiving address;

(c) a step of creating a receiving address list that includes at least the receiving address input in step (b) above; and (d) a step of adding the sending address to the receiving address list when it was input in step (a) above.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

The preferred embodiments of the present invention will be described in detail below with reference to the attached drawings.

1. First Embodiment

When sending an e-mail, the e-mail transmission apparatus comprising a first embodiment of the present invention also sends the e-mail to the sending e-mail address included in the e-mail.

Figure 1:
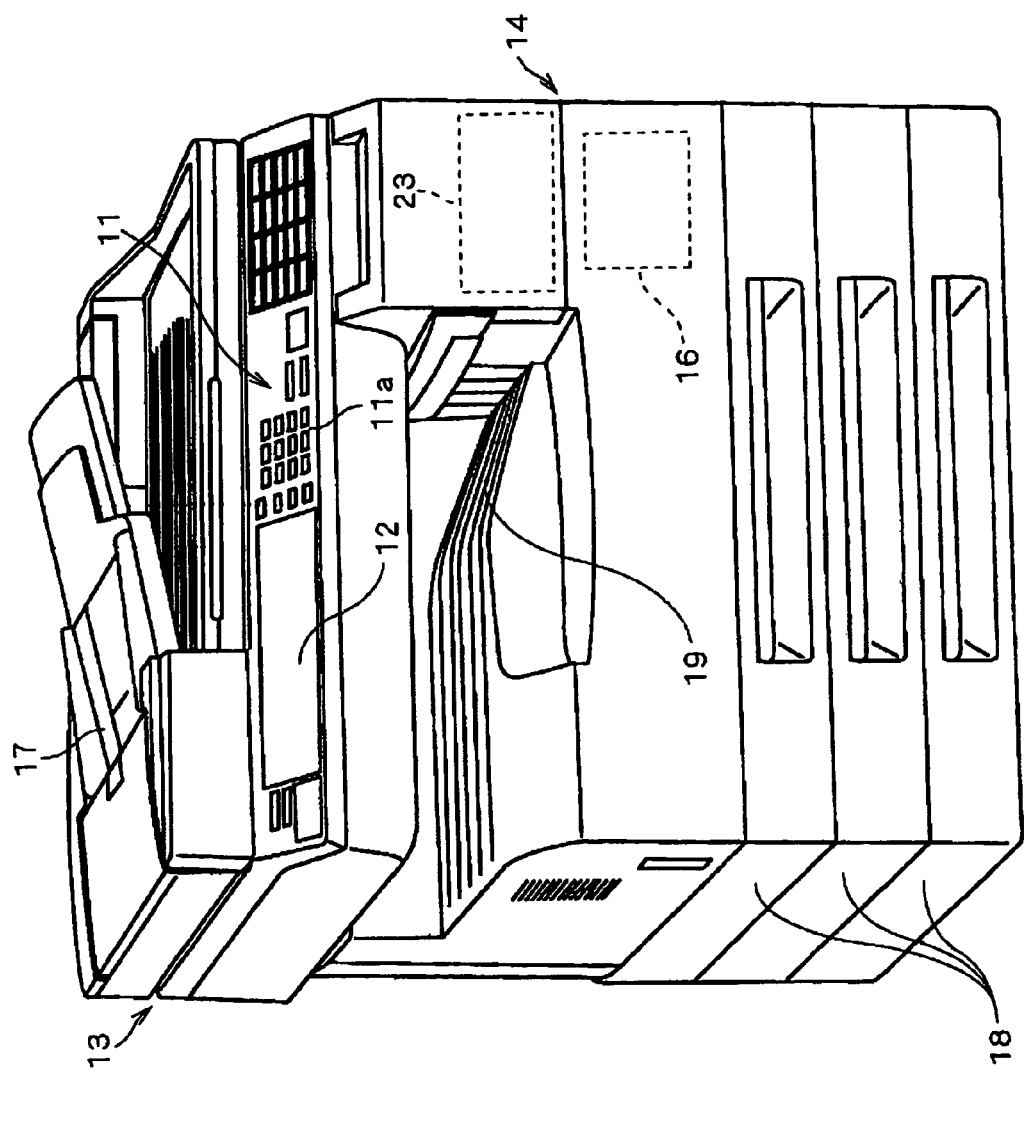
FIG. 1 is a front elevation of an MFP comprising a first embodiment of the present invention.

FIG. 1 is an external view of a multi-function peripheral (hereinafter referred to as 'MFP') 1 comprising the e-mail transmission apparatus of this embodiment. The MFP 1 is a multi-function machine that functions as a scanner, copier, printer, facsimile machine and the like, and can transmit and receive data over a network.

As shown in FIG. 1, the MFP 1 has multiple keys 11a, and includes an operation unit 11 that receives various instructions through user input using these keys and input of data such as letters and numbers, a display 12 that displays user instruction menus and information pertaining to obtained images, a scanner unit 13 that obtains image data through the electrooptical reading of an original document, and a printer unit 14 that prints images on recording sheets based on image data.

The MFP 1 further includes a feeder unit 17 located at the top of the main unit that sends original documents to the scanner unit 13, a paper supply unit 18 located at the bottom of the main unit that sends recording sheets to the printer unit 14, a tray 19 located in the middle of the main unit onto which recording sheets on which images have been printed by the printer unit 14 are ejected, an internal communication unit 16 that sends and receives e-mails and the like to and from external devices over a network, and a memory unit 23 that stores data. In addition, while not shown in the drawing, the MFP 1 has a network interface, and the communication unit 16 is connected to the network via the network interface such that it can send and receive various data to and from external devices.

The display 12 is used for various types of display, including display of a list of addressees for data transmission, while the operation unit 11 is used for various types of input, including user selection of a receiving address, and these components function as essential elements of the user interface.

The scanner unit 13 obtains image data through the electrooptical reading of image information, such as photographs, letters, drawings and the like, from an original document. The obtained image data (density data) is converted into digital data by an image processing unit not shown in the drawing, and after undergoing various types of public-domain image processing, the data is sent to the printer unit 14 or the communication unit 16, and thereafter supplied for image printing or data transmission or stored in the memory unit 23 for future use.

The printer unit 14 prints images on a recording sheet based on image data obtained from the scanner unit 13, image data received from an external device via the communication unit 16, or the image data stored in the memory unit 23.

The communication unit 16 sends and receives facsimile data over public telephone lines, and in addition sends and receives data using e-mail and the like over a network such as a LAN or the Internet to and from external devices connected to the network. In this way, the MFP 1 functions not only as a facsimile device that performs normal facsimile transmission, but also functions as an e-mail transmission apparatus. Therefore, it can send and receive various types of image data as an attached file to an e-mail. Moreover, the network transmission performed by the MFP 1 can be performed over a land line network or a wireless network, but in the example shown in the drawing, the land line-based transmission method is adopted.

Figure 2:
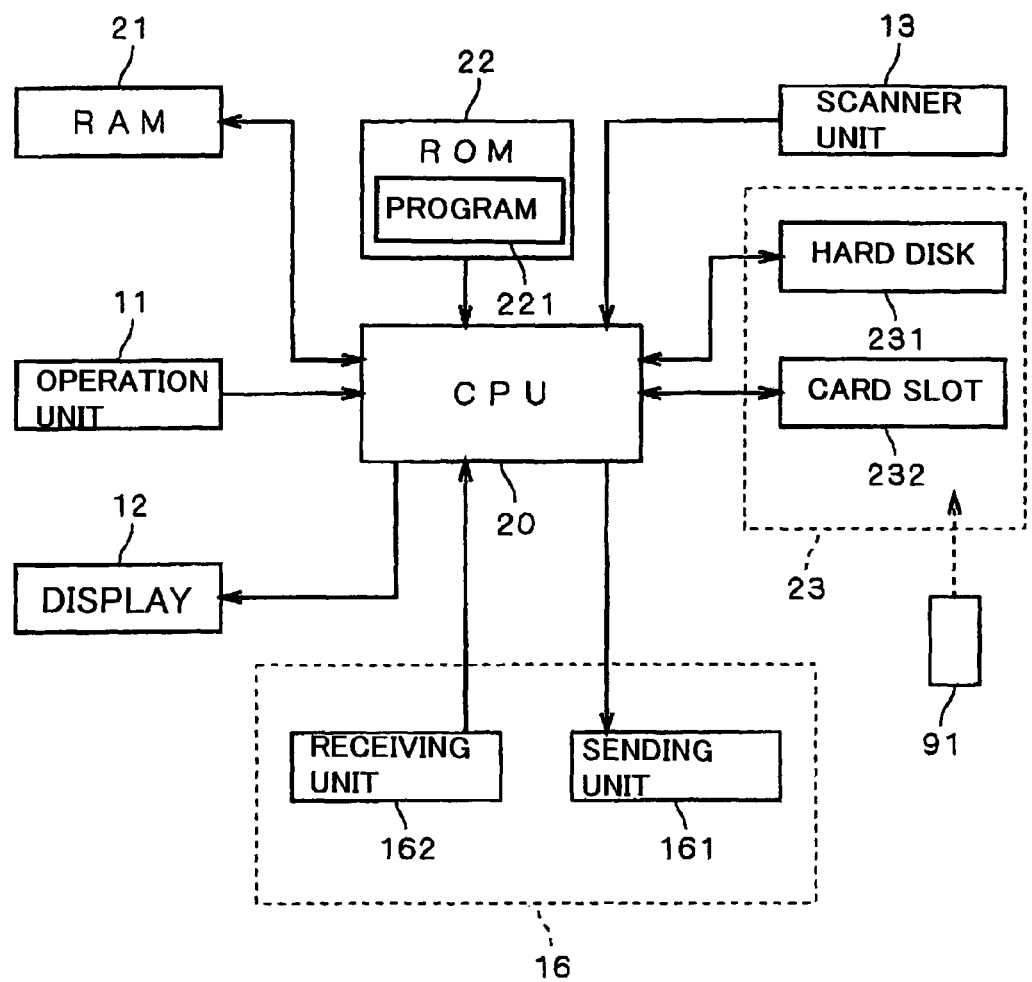
FIG. 2 is a drawing showing the construction of the MFP.

FIG. 2 is a block diagram showing the part of the MFP 1 construction pertaining mainly to this embodiment. The MFP 1 has a CPU 20 that performs various types of arithmetic processing and controls the overall operation of the MFP 1, and a RAM 21 that stores various types of data and a ROM 22 that stores a program 221 are connected to the CPU 20. Also connected to the CPU 20 are the operation unit 11, the display 12, the scanner unit 13, and the memory unit 23. The memory unit 23 comprises a hard disk 231 that stores various types of data such as the unique e-mail address assigned to the MFP 1 and a card slot 232 that reads information from a memory card 91. The RAM 21 comprises nonvolatile RAM.

In this way, various types of data can be transferred among the RAM 21, the scanner unit 13, the hard disk 231, and the memory card 91 mounted in the card slot 232 under the control of the CPU 20, and information stored in the RAM 21, the hard disk 231 or the memory card 91 may be displayed on the display 12 via the control of the CPU 20.

Also connected to the CPU 20 is the communication unit 16, which has a sending unit 161 and a receiving unit 162 that send and receive e-mail messages and the like to and from external devices connected over the network.

Figure 3:
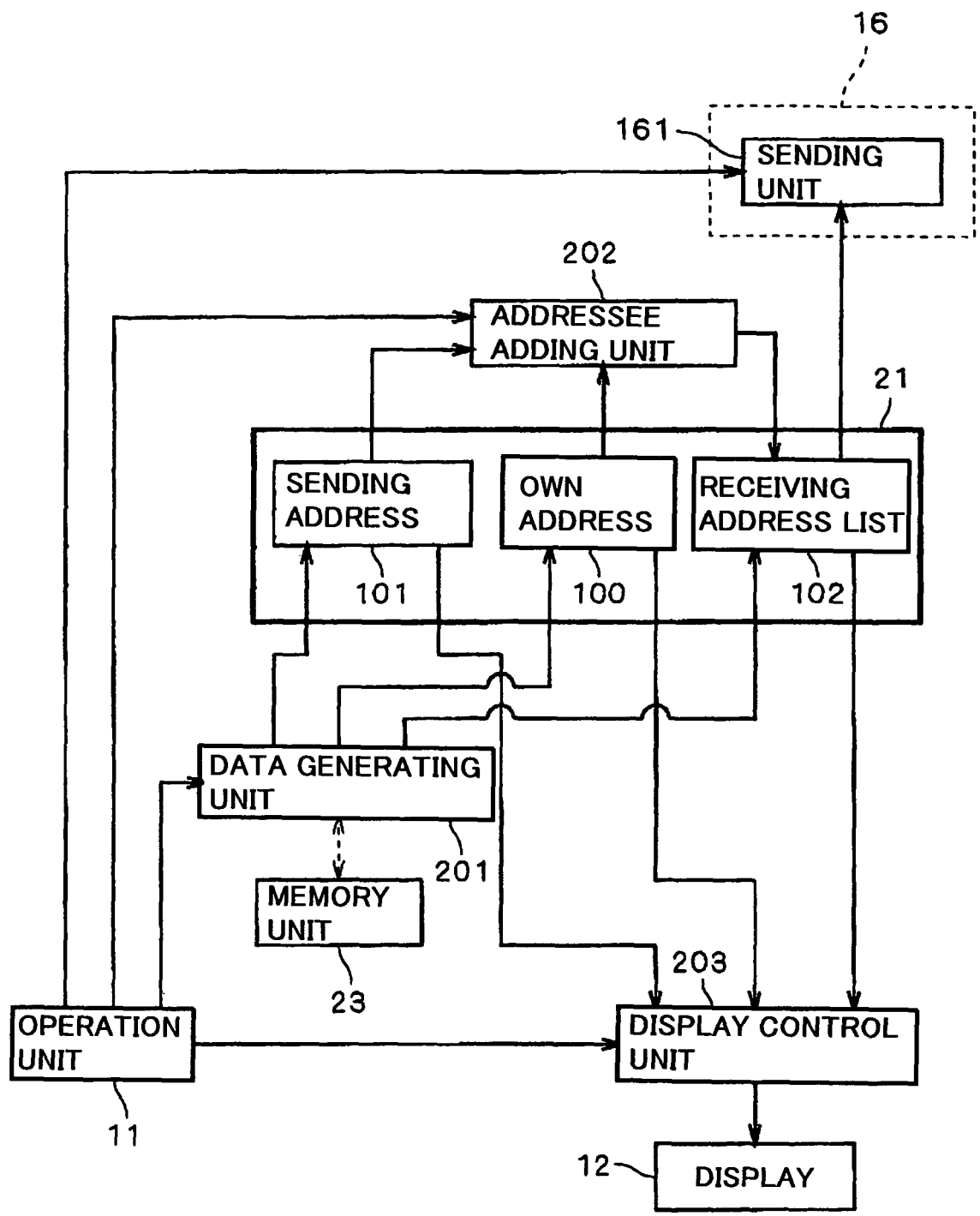
FIG. 3 is a block diagram showing the construction of the MFP.

FIG. 3 is a drawing that shows a functional construction in which operations are carried out by the CPU 20 in accordance with a program 221 residing in the ROM 22, as well as a different construction. Among the construction components shown in FIG. 3, the data generating unit 201, the addressee adding unit 202 and the display control unit 203 are the functions implemented using the CPU 20, etc.

The data generating unit 201 generates, through the receipt of a user instruction from the operation unit 11, a receiving address list 102 that comprises an own address 100 comprising the unique e-mail address data assigned to the MFP 1, a sending address 101 comprising sending address data when the MFP 1 sends an e-mail, and receiving address data, and it stores the receiving address list 102 in the RAM 21 or the memory unit 23.

The addressee adding unit 202 has a function to add to the receiving address list 102 the sending address 101 where necessary, by comparing the own address 100 with the sending address 101.

The display control unit 203 displays an e-mail recipient's e-mail address on the display 12, based on the receiving address list 102.

Figure 4:
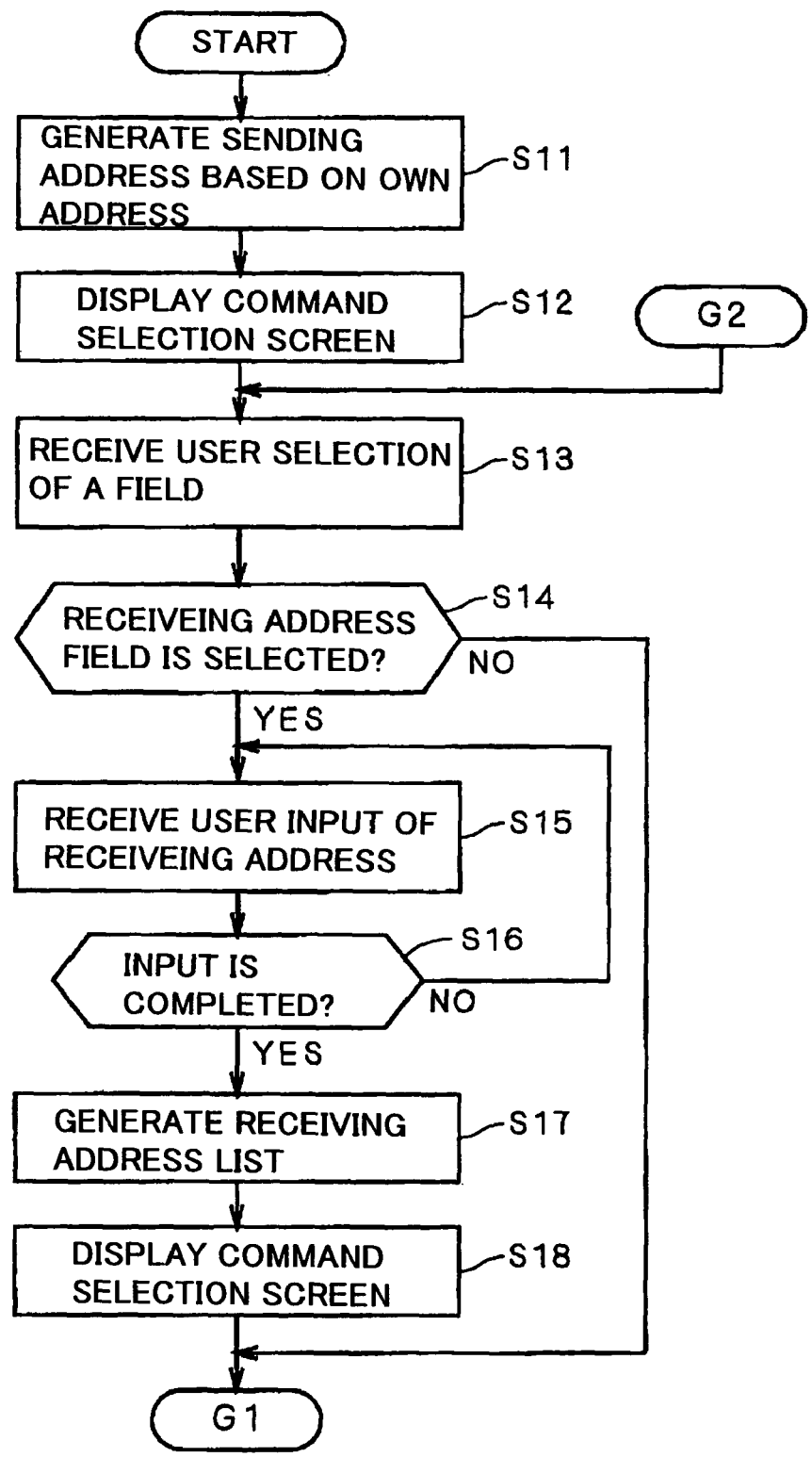
FIG. 4 is a flow chart showing the operations performed when the MFP sends e-mail.
Figure 5:
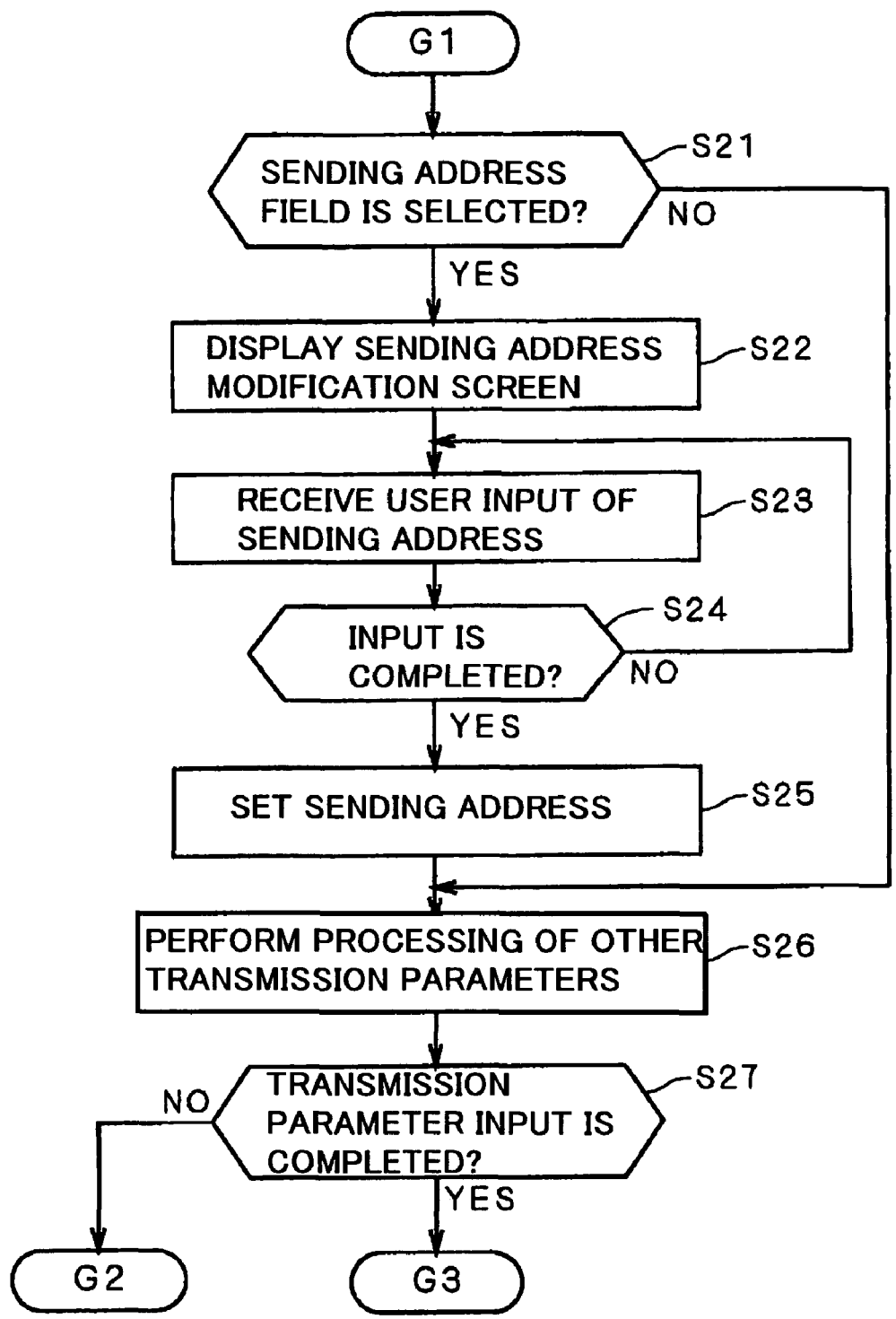
FIG. 5 is a flow chart showing the operations performed when the MFP sends e-mail.
Figure 6:
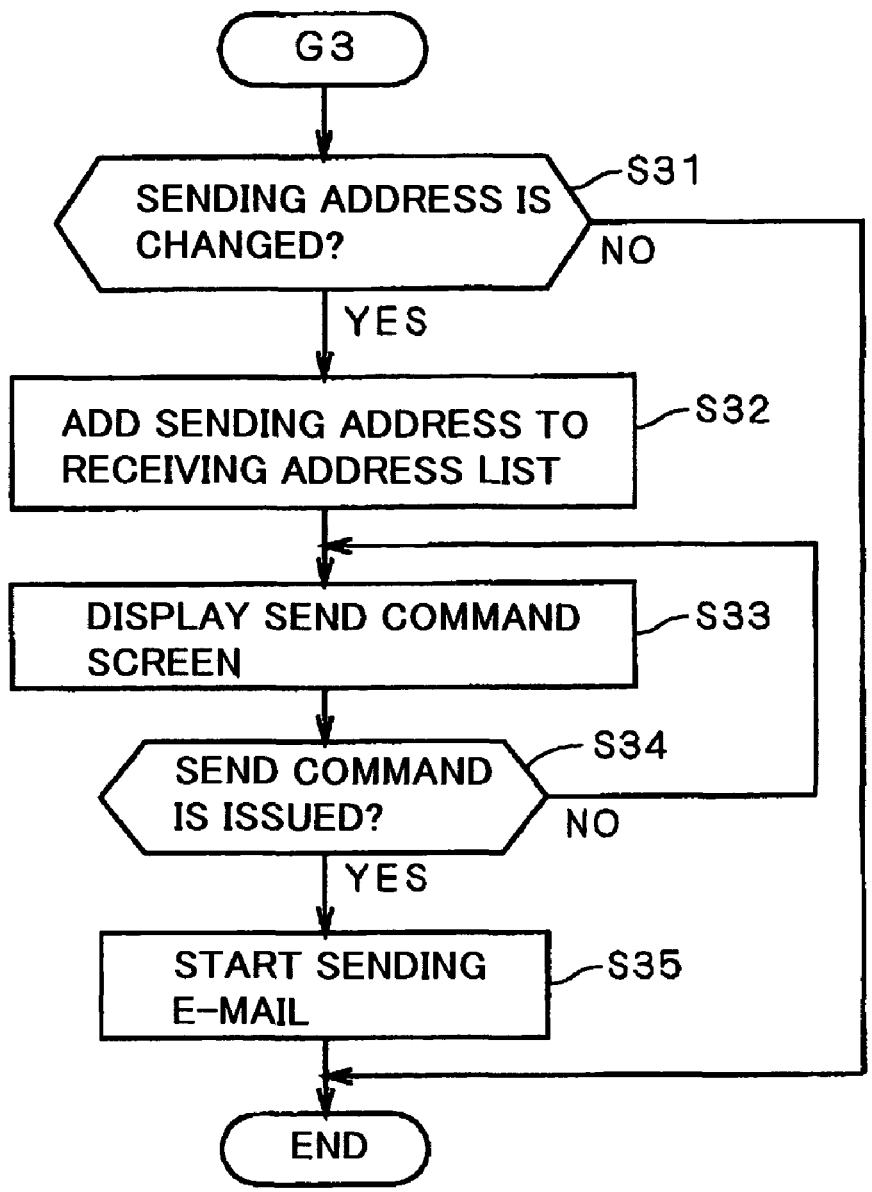
FIG. 6 is a flow chart showing the operations performed when the MFP sends e-mail.
Figure 7:
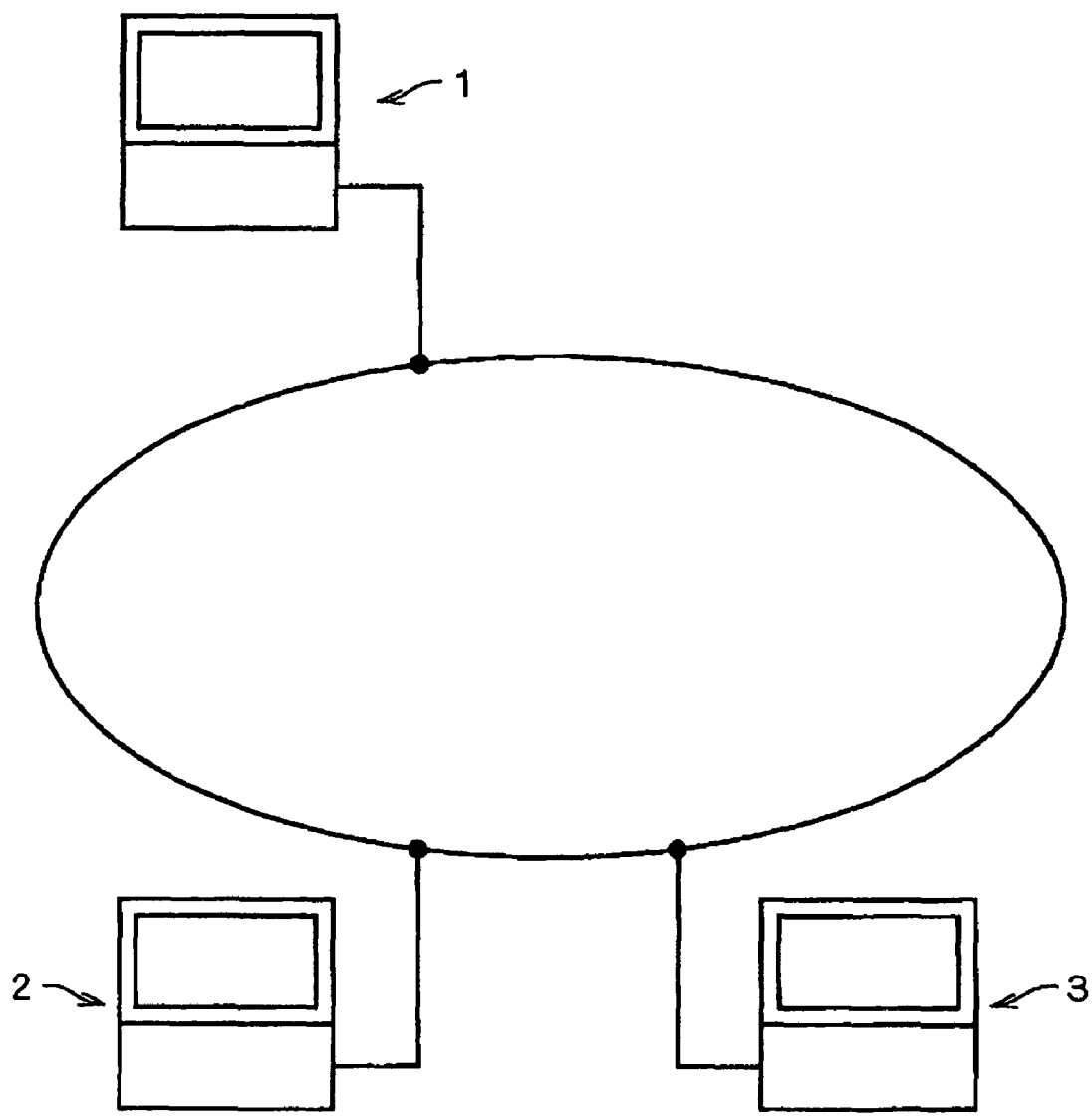
FIG. 7 is a drawing showing the state in which the MFP is connected to other terminals over a network.

FIG. 4 through FIG. 6 are flow charts showing the operations performed when the MFP 1 sends e-mail. FIG. 7 is a drawing showing an example in which the MFP 1 (which is deemed to have an own address of 1@111.co.jp) is connected to other terminals over a network. The terminals 2 (deemed to have an address of 2@222.co.jp) and 3 (deemed to have an address of 3@333.co.jp) are terminals that can each communicate with the MFP 1 via e-mail. With reference to these drawings, the operations performed when the MFP 1 sends e-mail will be explained, and where 'impersonation' occurs when the user uses the MFP 1, the manner in which the proper account holder can discover the 'impersonation' will be explained.

Figure 8:
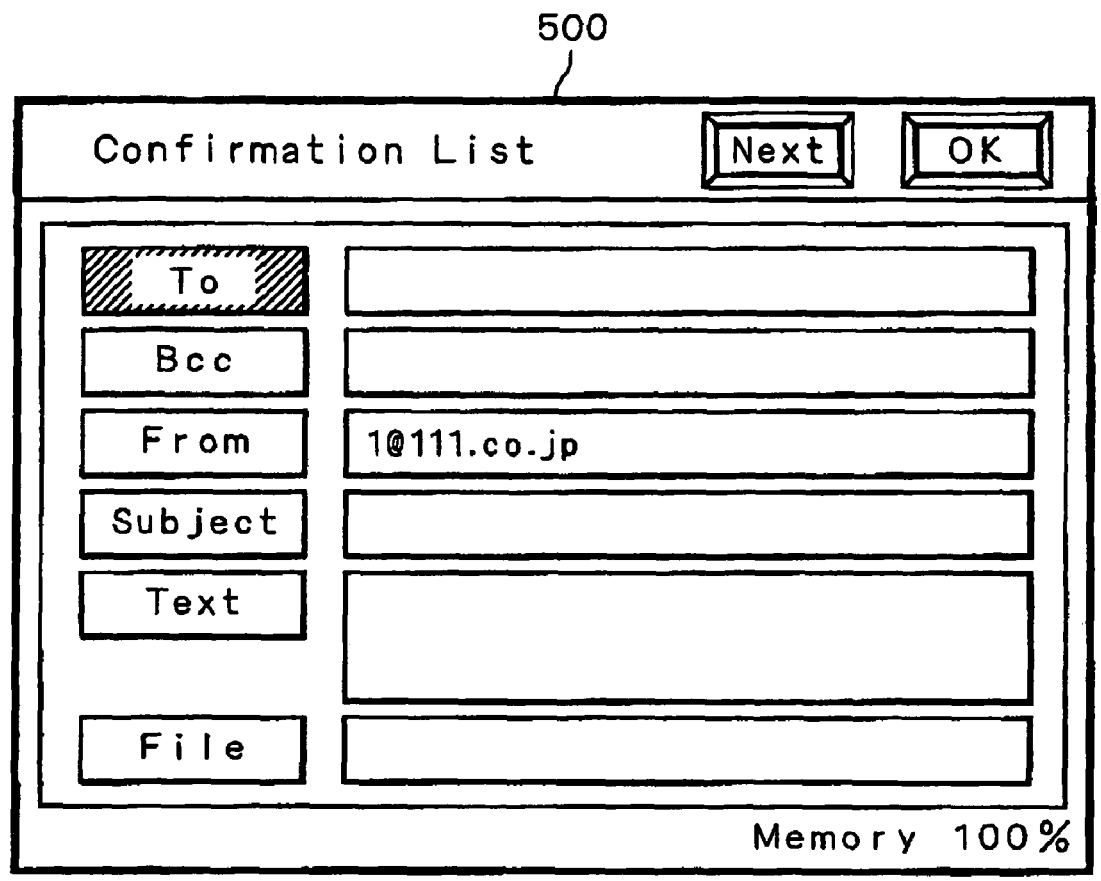
FIG. 8 is a drawing showing an example of an instruction selection screen.

First, the data generating unit 201 obtains the own address 100 stored beforehand in the memory unit 23 from the memory unit 23, and the sending address 101 is generated based on the own address 100 (step S11). The display control unit 203 displays on the display 12 the command selection screen 500 shown in FIG. 8 (step S12). When this occurs, the same address as the own address 100 (1@111.co.jp) is displayed as the default sending address 101 in the sending address field in the command selection screen 500 ('From'). The user can operate the multiple keys 11a belonging to the operation unit 11 and select fields in which to input transmission parameters while viewing the command selection screen 500.

Here, the term 'transmission parameters' refers to the various parameters necessary to send an e-mail such as the receiving address, title (subject), sending address and attached file name, and if the attached file includes an image, the image format, resolution, etc.

Figure 9:
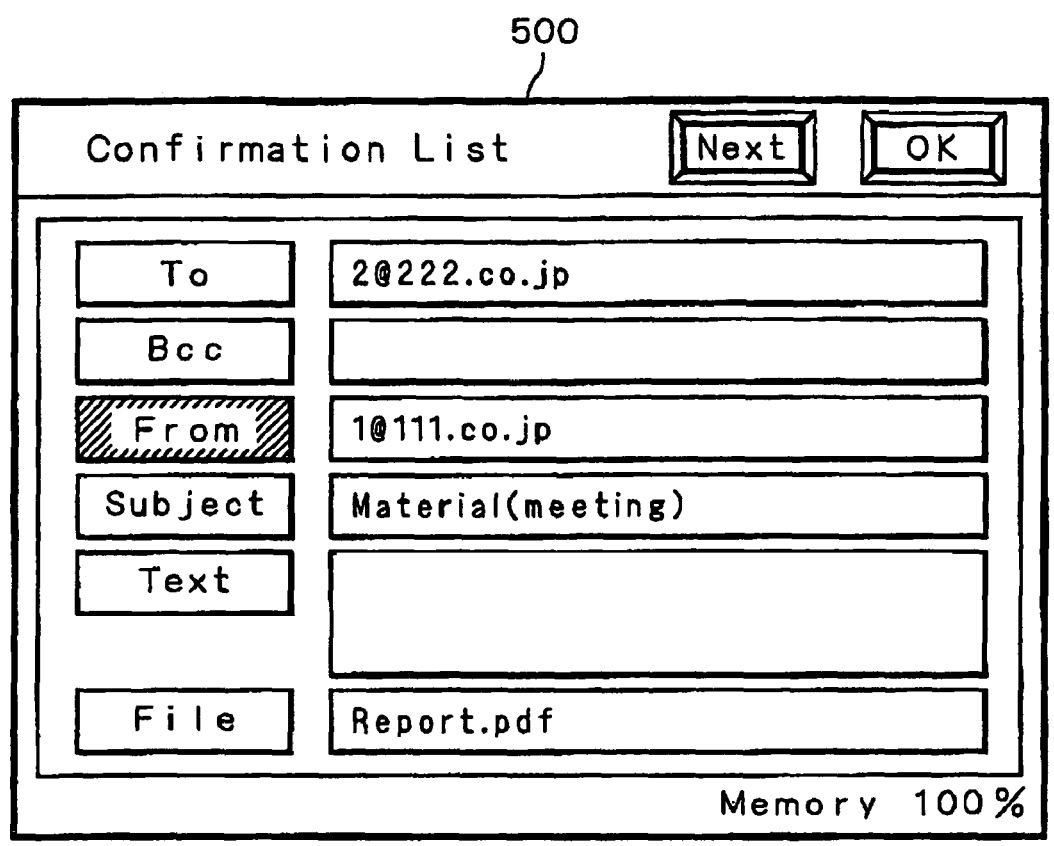
FIG. 9 is a drawing showing an example of an instruction selection screen.
Figure 10:
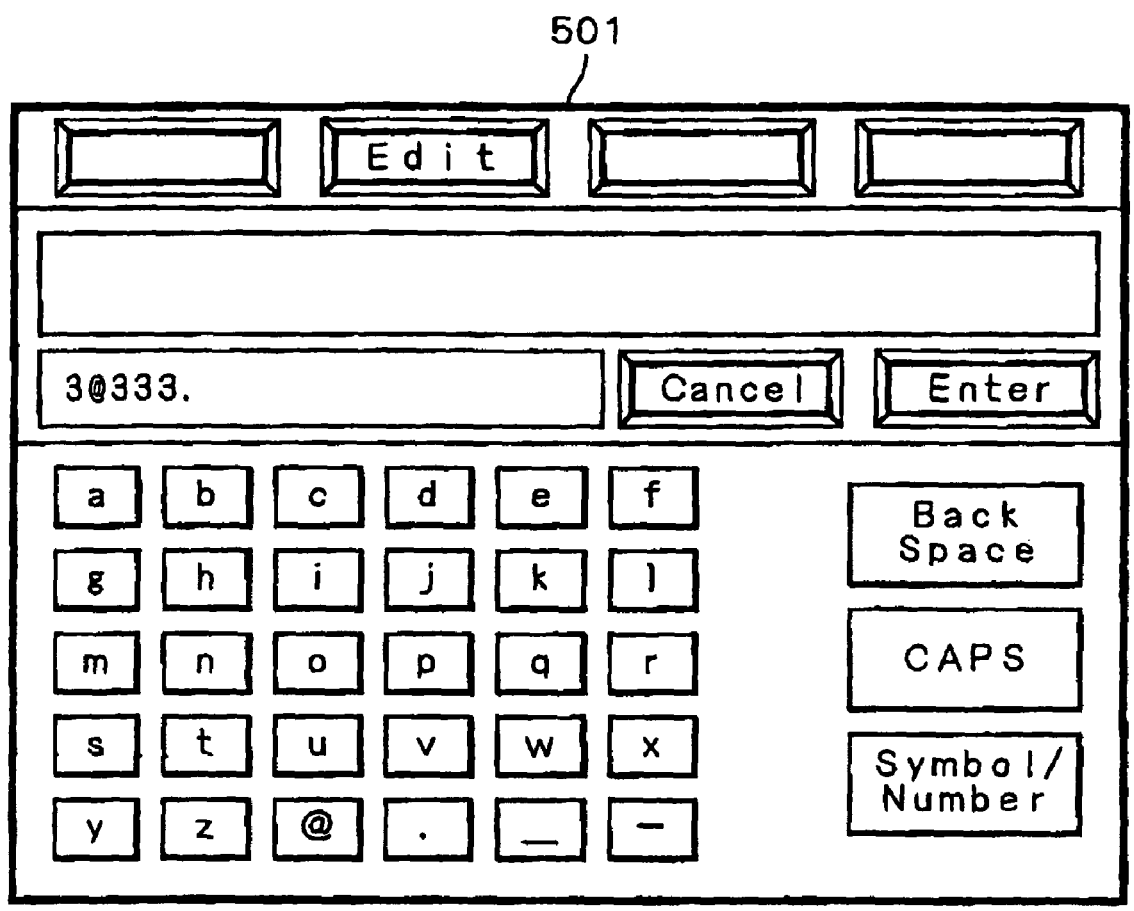
FIG. 10 is a drawing showing an example of a sending address modification screen.

Next, the data generating unit 201 receives user selection of a field and user input of transmission parameters (step S13). This includes, in addition to the receiving addresses ('To' and 'Bcc'), the sending address ('From') and the subject ('Subject'), the selection of fields for input of the message text and the names of attached files (both optional). When one of these fields is selected, it is determined whether or not the field selected is the receiving address ('To' or 'Bcc') (step S14). Where the receiving address field is selected, user input of the receiving address is received (step S15) and steps S15 and S16 are repeated until input is completed (step S16). When input is completed, the receiving address list 102 including all of the input receiving addresses is generated by the data generating unit 201 (step S17) and the command selection screen 500 shown in FIG. 9 is displayed by the display control unit 203 (step S18). FIG. 9 shows the situation in which input of the subject and attached file name is already completed.

Where the field selected is not related to a receiving address, the display control unit 203 determines whether or not the sending address field ('From') was selected (step S21 in FIG. 5), and where the sending address field was selected, the sending address modification screen 501 including the soft key arrangement display shown in FIG. 10 is displayed (step S22). The data generating unit 201 then receives user input of the sending address via operation of the multiple keys 11a comprising the soft keypad (step S23), steps S23 and S24 are repeated until input of the sending address is completed (step S24), and when the input of the sending address is completed, the input sending address is set as the sending address 101 in FIG. 3 (step S25). Where step S25 is not executed, the sending address generated from the own address 100 in step S11 is used as is for the sending address 101 here.

Where sending address modification is not selected, processing of input of other transmission parameters is performed (step S26). The display control unit 203 determines whether or not a command to complete transmission parameter input has been issued based on a user command from the operation unit 11 (step S27), and the processes of step S11 through S27 are repeated until a completion command is issued.

When a command to complete user input of the transmission parameters is issued, the addressee adding unit 202 determines whether or not the sending address 101 was changed from the own address 100 (step S31 in FIG. 6), and where it was changed, the sending address 101 is added to the receiving address list 102 (step S32).

Figure 11:
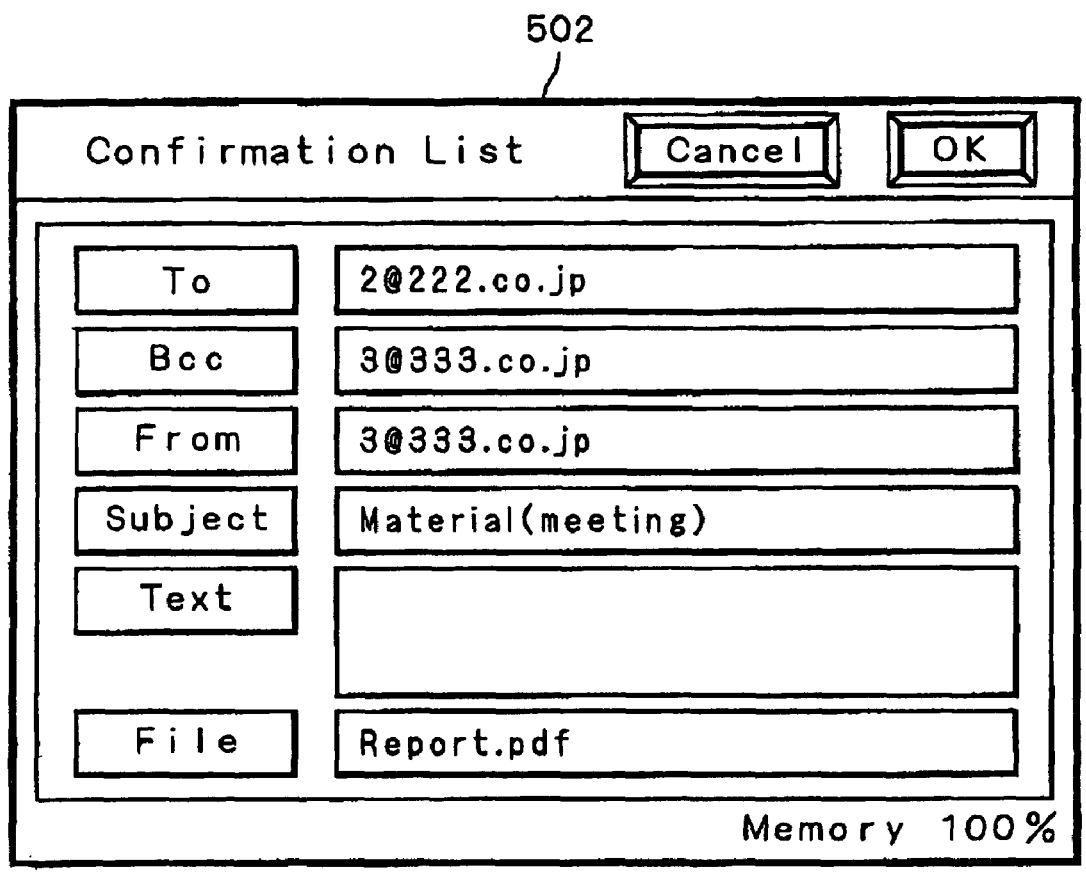
FIG. 11 is a drawing showing an example of a send instruction screen.

FIG. 11 is a drawing showing the send command screen 502 where the sending address 101 is added to the 'Bcc' (i.e., 'blind carbon copy', indicating a secret addressee not revealed as an addressee in the e-mail) field in the receiving address list 102 by the addressee adding unit 202. When step S32 is executed, the display control unit 203 displays the send command screen 502 shown in FIG. 11 (step S33). In other words, where an address different from the own address of the MFP 1 is set as the sending address, the display control unit 203 displays that the e-mail is also sent to the terminal 3 as shown in FIG. 11, by adding the address of the terminal 3 as a Bcc.

In this way, because a user trying to carry out 'impersonation' can see that the e-mail will be sent to not only the intended receiving addresses but also to the sending address, attempts to carry out such 'impersonation' can be discouraged.

Here, when the send command screen 502 is displayed, a command to delete (including effective deletion through modification) the sending address added to the receiving address list 102 is not received except when the sending address is returned to the own address of the MFP 1. The attribute of the added sending address is not limited to the 'Bcc' field shown in FIG. 11, and it may be instead added to the 'To' field as a normal receiving address and displayed, or to the 'Cc' field (i.e., carbon copy, indicating that the address is disclosed in the e-mail as a recipient), which is not shown in the drawing. However, in these cases, it is preferred that the automatically added sending address be non-deletable except when the sending address is returned to the own address of the MFP 1.

Figure 12:
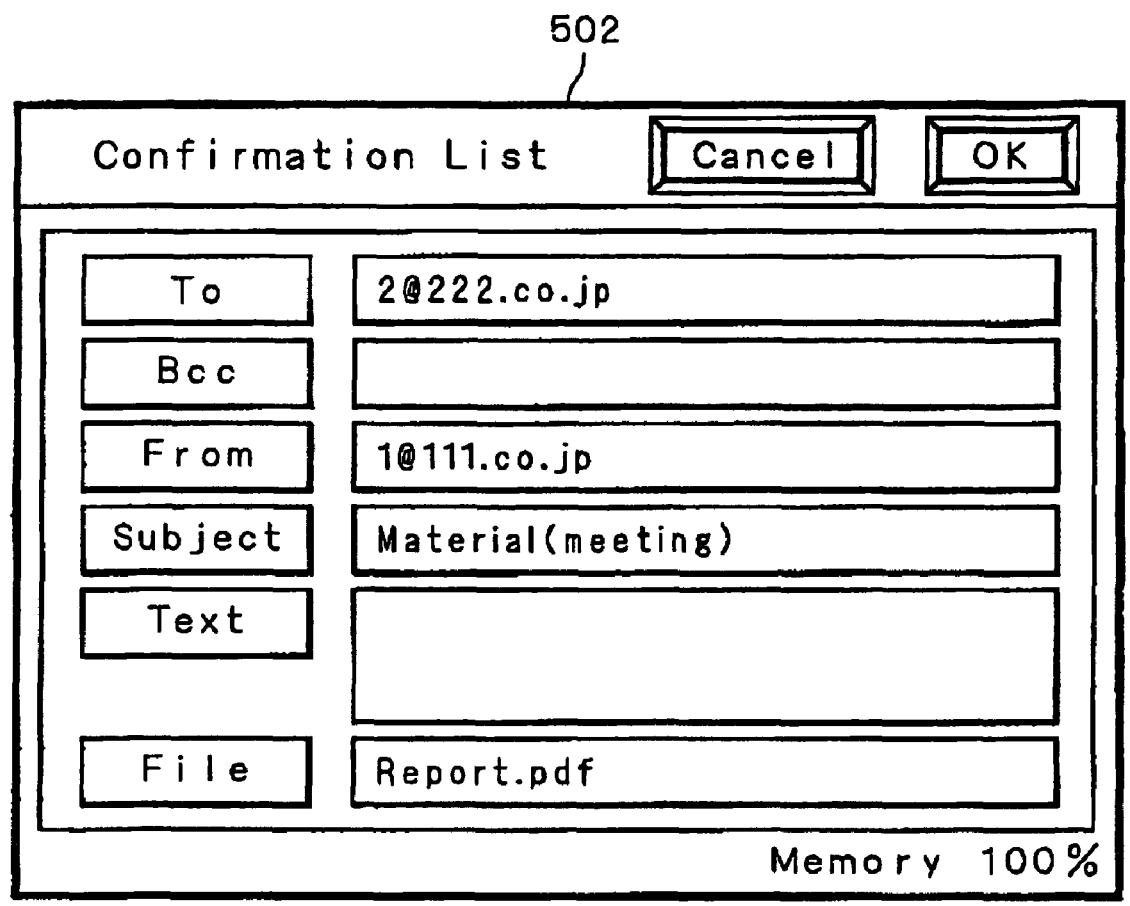
FIG. 12 is a drawing showing an example of a send instruction screen.

As described above, because the sending address 101 is automatically added to the receiving address list 102 in a format in which it cannot be deleted from the receiving address list 102, a user attempting to carry out 'impersonation' can be prevented from deleting the sending address 101 from the receiving address list 102 before transmission is begun.

Where the sending address 101 is the own address 100, it is deemed that 'impersonation' is not being carried out, the sending address 101 is not automatically added to the receiving address list 102, and the e-mail is not sent to the sending address. In this case, the display control unit 203 displays a send command screen 502 in which the sending address is not added as a 'Bcc' recipient (step S33), as shown in FIG. 12.

In this way, the sending address can be added to the receiving address list 102 only where the sending address and the own address do not match and the sending address was changed (i.e., the sending address was input using the operation unit 11), and by sending the e-mail to the sending address, thereby confirming the existence of 'impersonation', only where it is possible that 'impersonation' is being carried out, the load on the network can be reduced.

Furthermore, where it is determined whether or not the user has issued a command to begin sending (step S34) and a command to begin sending has been issued, the e-mail is sent in a parallel fashion to all addresses registered in the receiving address list 102 (not only the receiving addresses, but where a sending address has been added, the sending address as well) (step S35). Here, 'parallel sending' means the essentially simultaneous transmission of an e-mail to multiple recipients, or sequential sending during a series of transmission operations.

As described above, when sending an e-mail, the MFP 1 automatically adds the e-mail address input by the user as the sending address to the receiving address list 102, and based on the receiving address list 102, sends the same e-mail to the sending address in the receiving address list 102 in addition to sending the e-mail to the receiving addresses in the receiving address list 102. As a result, where the user who is actually sending the e-mail is not the proper account holder of the address input as the sending address, the proper account holder can learn, from the arrival of an e-mail on his terminal 3 that he does not recall sending, both of the occurrence of 'impersonation', i.e., that his own e-mail address was used as the sending address, and of the contents of the e-mail, and can take appropriate measures.

2. Second Embodiment

In the first embodiment, the additional sending to the input sending address was carried out parallel to the sending to the receiving addresses, but it is also possible to send the e-mail to the sending address and the receiving addresses independently. In this case, because the e-mail sent to the sending address is intended to enable discovery of 'impersonation', it is acceptable to send only the e-mail message text, and omit any attached file. Furthermore, there are cases in which under appropriate circumstances the user's personal unique address, which differs from the MFP 1's own address, is used as the sending address. A construction may be adopted in which, in order that the e-mail can be sent from the MFP 1 to the intended receiving addresses only in that case, a validating e-mail is sent to the input sending address beforehand, and sending of the e-mail to the intended receiving addresses is begun only when a return message is returned in response to this validating e-mail.

Figure 13:
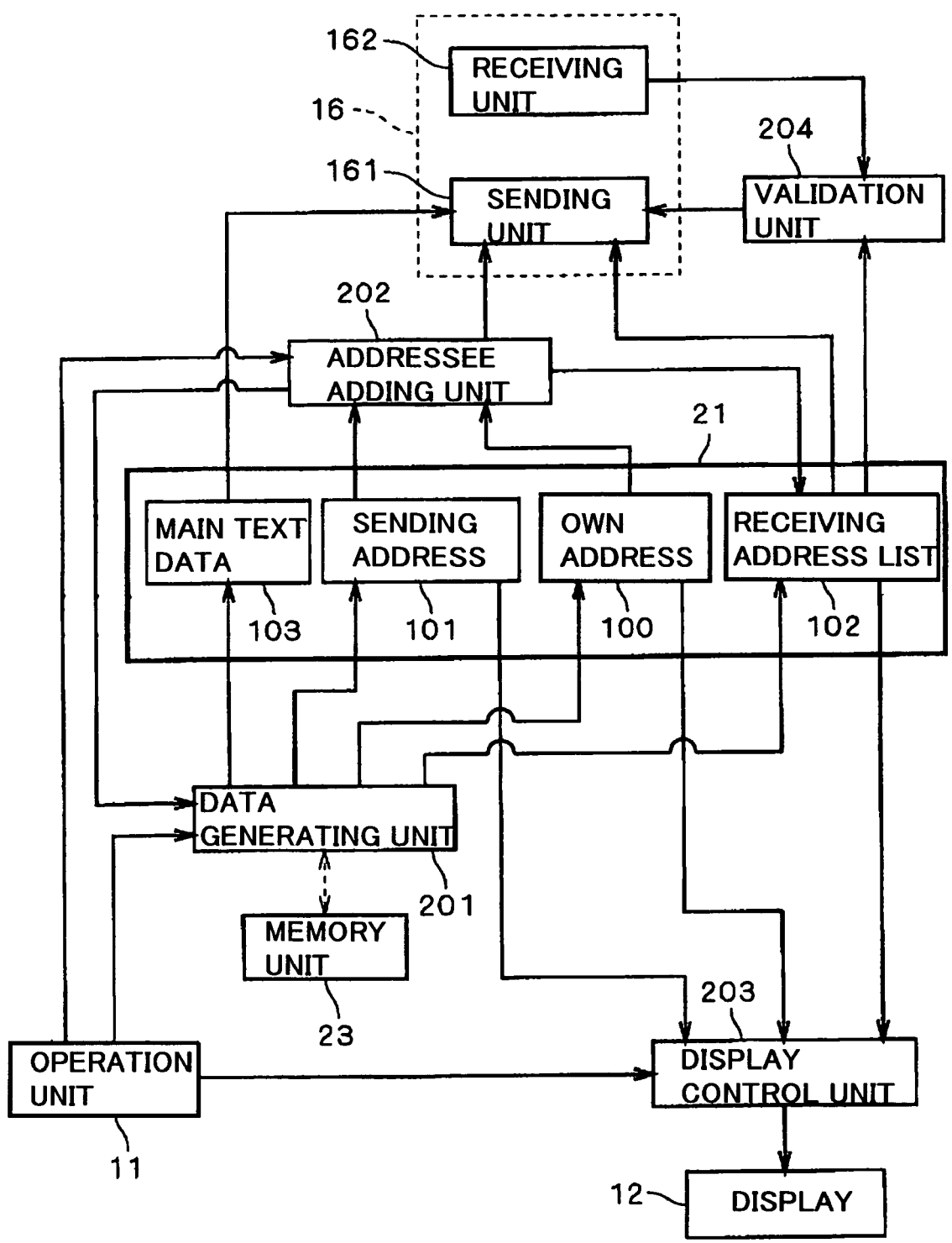
FIG. 13 is a block diagram showing the functions of the MFP comprising a second embodiment of the present invention.

FIG. 13 is a block diagram showing the construction of the MFP 1 of the second embodiment which is constructed along the lines described above. Those components of the construction shown in FIG. 13 that are identical to those of the MFP 1 of the first embodiment are assigned the same symbols where appropriate, and identical functions will not be explained here.

The MFP 1 of the second embodiment also has a validation unit 204, which is a function realized by the CPU 20, etc. and shown in FIG. 13, and the communication unit 16 has a receiving unit 162 that receives e-mails from other terminals over the network.

The data generating unit 201 determines whether or not a file has been attached to the e-mail based on a command from the addressee adding unit 202 where the sending address has been added to the receiving address list 102, and where there is an attached file, generates main text data 103 comprising the e-mail from which the attached file is excluded.

When a user command to begin sending is received from the operation unit 11, the addressee adding unit 202 determines whether or not the sending address 101 is to be automatically added to the receiving address list 102, as in the first embodiment, and where the address is automatically added, it issues a command to the data generating unit 201 to generate the main text data 103 and issues a command to the sending unit 161 instructing it to independently send only the main text data 103 to the sending address automatically added to the receiving address list 102, while where the address is not automatically added, the addressee adding unit 202 issues a command to the sending unit 161 instructing it to execute normal sending, including the attached file, only to the intended receiving addresses (the e-mail addresses input by the user as the receiving addresses), based on the receiving address list 102.

The validation unit 204 has the functions of confirming whether or not the receiving unit 162 has received a return message in response to the e-mail sent to the sending address, and issuing a command to the sending unit 161 to begin sending the e-mail only where the return message has been received.

Figure 14:
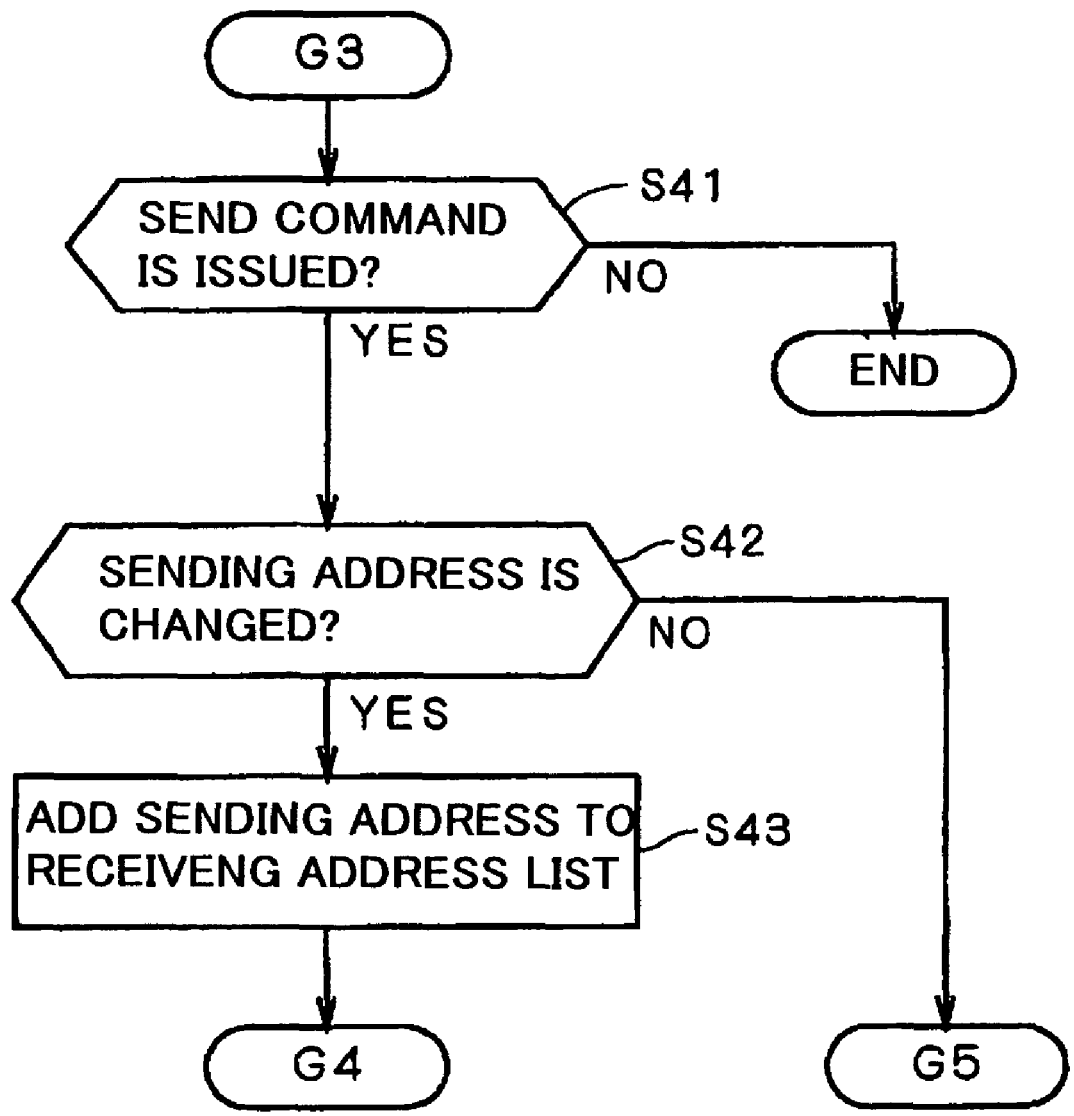
FIG. 14 is a flow chart showing the operations performed when the MFP sends e-mail.
Figure 15:
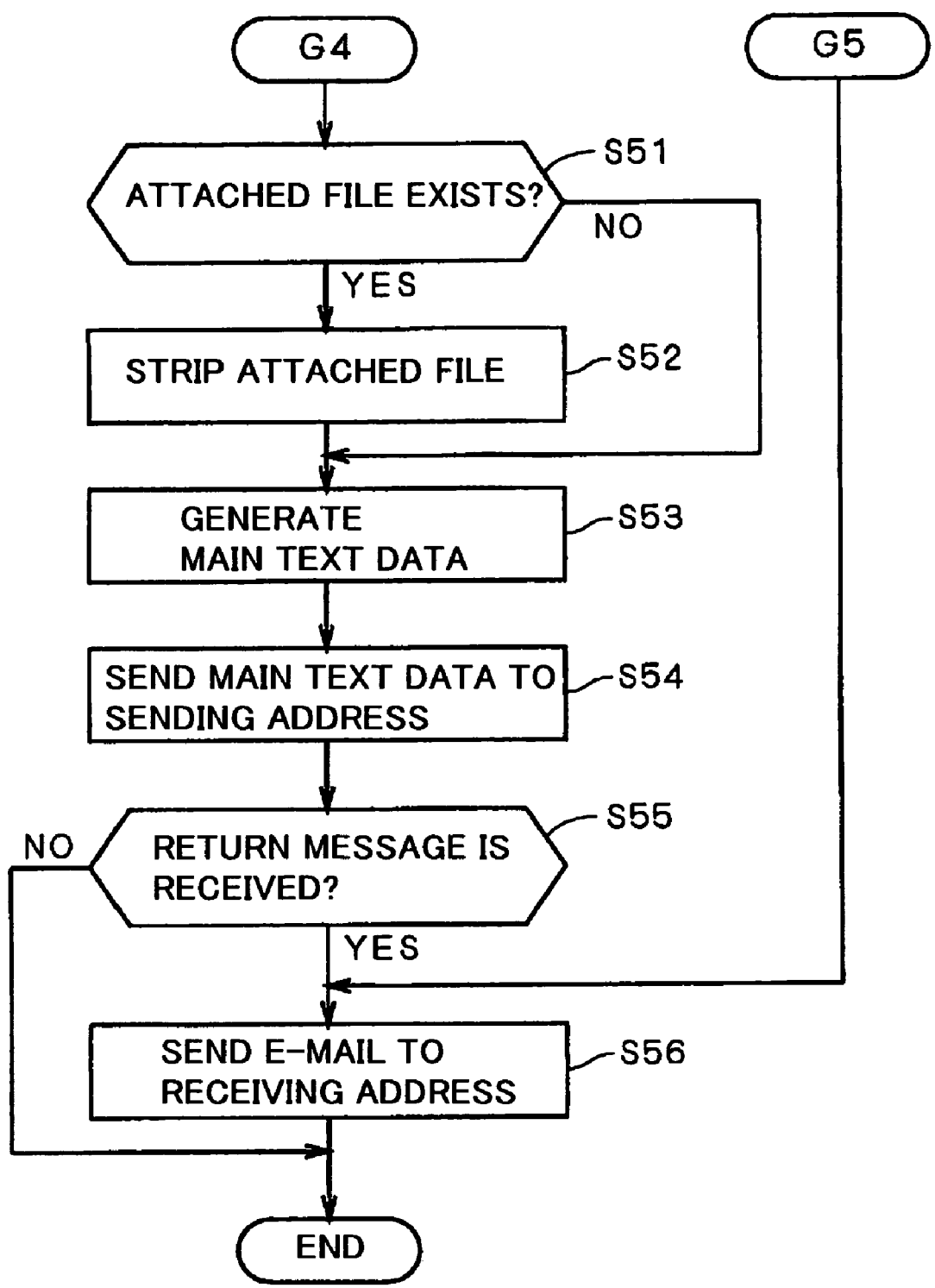
FIG. 15 is a flow chart showing the operations performed when the MFP sends e-mail.

FIGS. 14 and 15 are flow charts showing the operations performed when the MFP 1 of the second embodiment sends an e-mail. FIG. 14 shows the processing performed following the processing shown in FIGS. 4 and 5 in connection with the first embodiment. The operations performed when the MFP 1 of the second embodiment sends an e-mail will be explained with reference to these drawings.

First, when the transmission parameter input process is completed in the same manner as shown in FIGS. 4 and 5 (step S27 in FIG. 5), the addressee adding unit 202 determines whether or not the user has issued a command via the operation unit 11 to begin sending of the e-mail (step S41). If it is determined that a command to begin sending has been issued, it is determined, as in the step S31 shown in FIG. 6, whether or not the sending address 101 was changed from the own address 100 (step S42), and where it was changed, the sending address 101 is automatically added to the receiving address list 102 (step S43) and a signal (referred to hereinafter as an 'add signal') is issued to the data generating unit 201 and the sending unit 161 indicating that the sending address 101 was automatically added to the receiving address list 102. Where it is determined in step S41 that a command to begin sending was not issued, the send process is terminated.

Next, the data generating unit 201 determines based on the add signal from the addressee adding unit 202 whether or not the user-selected e-mail has an attached file (step S51). If there is an attached file, the attached file is stripped from the e-mail (step S52) and main text data is generated (step S53), while if there is no attached file, the main text data 103 is generated without other processing (step S53).

Based on the add signal from the addressee adding unit 202, the sending unit 161 sends the e-mail comprising the main text data 103 to only the sending address, while referring to the sending address that was automatically added to the receiving address list 102 (step S54).

In this way, a validating e-mail can be sent to the sending address in the receiving address list 102 independently from the e-mail sent to the intended receiving addresses in the receiving address list 102, and in doing so, because only the main text data 103—which comprises only a part of the data comprising the entire e-mail—is sent, the amount of data sent over the network can be reduced and the load on the network limited accordingly. Moreover, as a simpler method, an e-mail consisting only of header information such as the sending address, the receiving address, the subject, etc. may be sent in step S54 as the validating e-mail. In this case, the load on the network is reduced even further.

Furthermore, the validation unit 204 determines whether or not a return message was sent from the sending address to the receiving unit 162 (step S55), and where such a return message was received, a command is sent to the sending unit 161 instructing it to send an e-mail that includes an attached file to all receiving addresses based on the receiving address list 102 (step S56). However, because it is not necessary to send a duplicate e-mail to the automatically added sending address, no e-mail is sent to the sending address. On the other hand, where there is no return message, no e-mail is sent to the receiving addresses.

As described above, because a validating e-mail is sent beforehand to only the sending address and an e-mail can be sent to the receiving addresses in the receiving address list 102 only where a return message is received from the sending address in response to this validating e-mail, and as a result validation by the user of the sending address is obtained before the e-mail is sent to the receiving addresses, 'impersonation' can be prevented.

Where the addressee adding unit 202 did not automatically add the sending address 101 to the receiving address list 102, a signal is sent to the sending unit 161 instructing it to perform normal sending. In this case, the sending unit 161 sends an e-mail including any attached files to the receiving addresses based on the receiving address list 102 (step S56).

As described above, because where the sending address was changed, a validating e-mail comprising only the main text data is sent only to the sending address in the second embodiment, and the sending of the e-mail to the receiving addresses is permitted only where a return message responding to this validating e-mail is received, the load on the network is further reduced relative to the first embodiment.

In addition, it is also acceptable if sending to the intended receiving addresses is permitted only where a return message is received within a prescribed period of time after the validating e-mail is sent.

3. Variations

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, the operation unit 11 is not limited to a device that accepts key input as in the above embodiments, and a different device may be used so long as it is capable of issuing commands and inputting data such as letters and numbers through user operation. For example, it is acceptable if the display incorporates a touch panel, tablet or the like.

In the MFP 1 of the first embodiment, where the sending address was changed, the user is notified of the sending of the e-mail to that address through the display of that address in the 'Bcc' field on the display screen. However, it is also acceptable if, where the sending address was changed, the e-mail is sent to that address without displaying it on the display screen. In this case, the fact that 'impersonation' has occurred may be discovered without the user who is carrying out the 'impersonation' knowing that his act is being exposed.

In the MFP 1 of the first and second embodiments, all processes involve software processing executed by the CPU 20, but some or all of these processes may be carried out using dedicated physical logic circuits.

Figure 16:
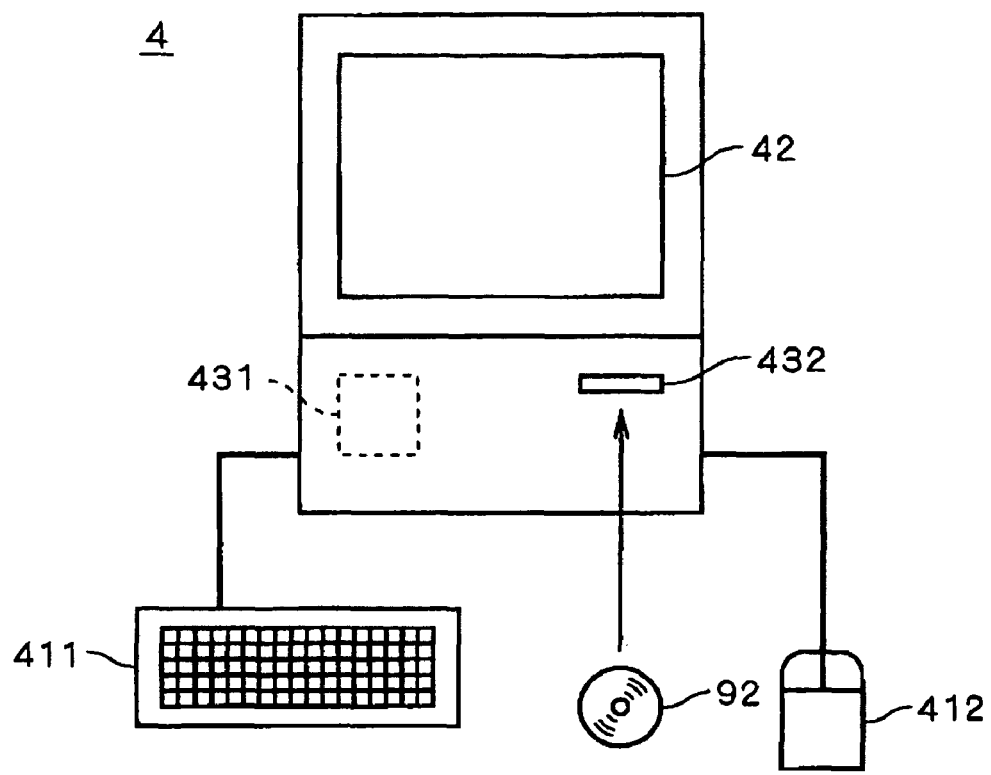
FIG. 16 is a front elevation of a personal computer comprising another embodiment of the present invention.

In the first and second embodiments, explanations were provided using the MFP 1 as an e-mail transmission apparatus, but an e-mail transmission apparatus is not limited to the apparatus described therein, and may be implemented in the form of a standard personal computer. FIG. 16 is a front elevation of an e-mail transmission apparatus 4 in which the hardware construction of the e-mail transmission apparatus of the present invention is that of a standard personal computer. As shown in FIG. 16, the e-mail transmission apparatus 4 has a keyboard 411 and mouse 412 to receive instructions from the user, and a display 42 to display command menus to the user and display obtained images, etc. It also has an internal hard disk 431 that stores e-mail data, programs and the like, and in addition, a recording medium 92 on which various types of data are recorded can be loaded in a medium reading device 432.

Figure 17:
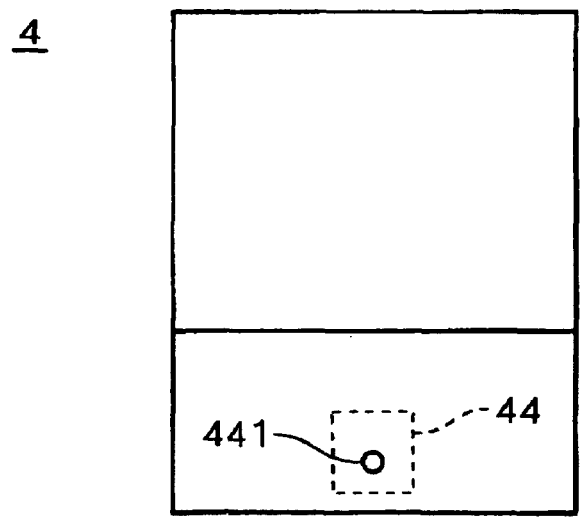
FIG. 17 is a rear elevation of the personal computer.

FIG. 17 is a rear view of the e-mail transmission apparatus 4. The e-mail transmission apparatus 4 has an internal communication unit 44 that sends and receives data over a network, and is connected to a network such as public telephone circuits, a LAN or the Internet via a network interface 441.

Figure 18:
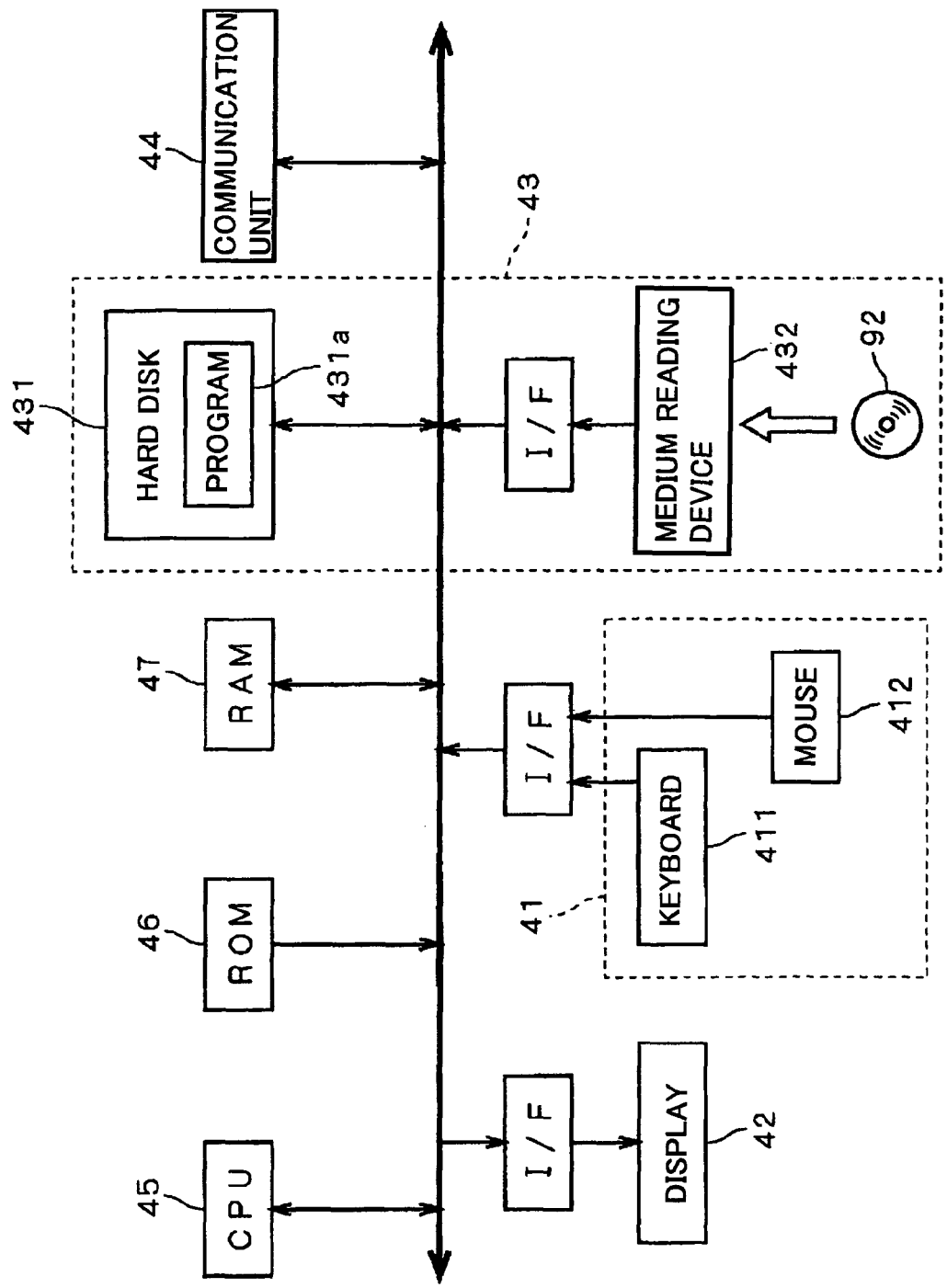
FIG. 18 is a drawing showing the construction of the personal computer.

FIG. 18 is a block diagram showing the construction of the e-mail transmission apparatus 4. The hardware construction of the e-mail transmission apparatus 4 is that of a standard computer system in which the CPU 45, RAM 47 and ROM 46 are connected to the bus line. However, a new e-mail transmission program component compatible with the features of the present invention is installed as the communication software. Also connected to the bus line via a connection interface (I/F) as appropriate are a display 42, a keyboard 411 and a mouse 412 that comprise an operation unit 41 that receives user input, a hard disk 431 that serves as a memory unit 43 that stores data, a program 431a and the like, a medium reading device 432 that reads information from a recording medium 92 that comprises an optical disk, magnetic disk, opto-magnetic disk or the like, and a communication unit 44 that sends and receives e-mails to and from external devices over a network. The e-mail transmission apparatus 4 performs the same operations as those carried out by the MFP 1 of the first and second embodiments through the appropriate execution by the CPU 20 of the program 431*a* stored on the hard disk 431. However, in the MFP 1 of the first and second embodiments, where the own address 100 is obtained as the default sending address 101 in the step S11 of FIG. 4, and if this own address 100 was changed, the e-mail was sent to the sending address after the change, but in the e-mail transmission apparatus 4 comprising a personal computer, there is no unique own address assigned to the apparatus. As a result, in the default state, the sending address field is blank, and if an e-mail address is input in the sending address field, the e-mail is invariably sent to that address. In fact, the default state of the sending address field may be set to be blank as described above even in the MFP 1 of the first and second embodiments. In this case, where the e-mail address input into the sending address field is different from the unique own address 100 of the MFP 1, the e-mail is sent to that address.

According to the present invention as described above, because the sending address is added to the receiving address list when user input of the sending address is received, 'impersonation' can be prevented or discovered regardless of the functions of the receiving device and without requiring the user to perform a special operation. Moreover, where an e-mail having the same contents as the e-mail sent to the receiving address is sent to the sending address, not only can the fact that 'impersonation' occurred be discovered, but the contents of the e-mail can be learned as well.

Furthermore, where an e-mail is sent to the receiving addresses in the receiving address list only where the e-mail has been sent to the sending address in the receiving address list and a return message has been received in response to this sent e-mail, the load on the network can be minimized.

In addition, where only a part of the data comprising the e-mail is sent when the e-mail is sent to the sending address in the receiving address list, the load on the network can be further reduced.

Moreover, where the sending address is added to the receiving address list only if the input sending address does not match the unique e-mail address assigned to the e-mail transmission apparatus, because 'impersonation' prevention measures are taken only where there is a possibility that 'impersonation' is occurring, the load on the network can be minimized.

Furthermore, where the sending address is added to the receiving address list in a format in which it cannot be deleted therefrom, a user seeking to carry out 'impersonation' can be prevented from deleting the sending address from the receiving address list and rendering ineffective the 'impersonation' prevention measures of the present invention.

In addition, where the receiving addresses and the sending address in the receiving address list are displayed, the occurrence of 'impersonation' can be discouraged in advance.

What is claimed is:

1. An e-mail transmission apparatus comprising: (a) sending address input means for receiving input of a sending address by a user; (b) receiving address input means for receiving input of a receiving address by the user; (c) list creation means for creating a receiving address list that includes at least the receiving address input via the receiving address input means; (d) address adding means for, when a sending address is input via the sending address input means, adding the sending address to the receiving address list containing the receiving address; (e) display means for displaying the receiving address and sending address contained in the receiving address list; and (f) sending means for sending an e-mail to the sending address based on the receiving address list, wherein the address adding means automatically adds the sending address to the receiving address list in a format such that it cannot be deleted before sending from the receiving address list by the user who inputted the sending address in order to prevent or discover impersonation in e-mail transmission efficiently.

2. A method for use with an e-mail transmission apparatus, comprising the steps of: (a) receiving input of a sending address by a user; (b) receiving input of a receiving address by the user; (c) creating a receiving address list that includes at least the receiving address input at step (b); (d) automatically adding the sending address to the receiving address list containing the receiving address when it is input at step (a); (e) displaying the receiving address and sending address contained in the receiving address list, wherein at step (d) the sending address is automatically added to the receiving address list in a format such that it cannot be deleted before sending from the receiving address list by the user who inputted the sending address in order to prevent or discover impersonation in e-mail transmission efficiently; and (f) sending an e-mail to the sending address based on the receiving address list.

3. An e-mail transmission apparatus, comprising: a sending address input unit for receiving input of a sending address by a user; a receiving address input unit for receiving input of a receiving address by the user; a list creation unit that creates a receiving address list that includes at least the receiving address input via the receiving address input unit; an address adding unit that, when a sending address is input via the sending address input unit, automatically adds the sending address to the receiving address list containing the receiving address, in a format such that the sending address cannot be deleted from the receiving address list, wherein the address adding unit adds the sending address to the receiving address list in a format such that it cannot be deleted before sending from the receiving address list by the user who inputted the sending address in order to prevent or discover impersonation in e-mail transmission efficiently; a display unit for displaying the receiving address and sending address contained in the receiving address list; and a sending unit for sending an e-mail to the sending address based on the receiving address list.

* * * * *